(12) United States Patent
Watanabe

(10) Patent No.: US 9,056,634 B2
(45) Date of Patent: Jun. 16, 2015

(54) VEHICLE BODY FRAME STRUCTURE

(71) Applicant: HONDA MOTOR CO., LTD., Minato-ku, Tokyo (JP)

(72) Inventor: Yasunori Watanabe, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/375,882

(22) PCT Filed: Apr. 3, 2013

(86) PCT No.: PCT/JP2013/060174
§ 371 (c)(1),
(2) Date: Jul. 31, 2014

(87) PCT Pub. No.: WO2013/179759
PCT Pub. Date: Dec. 5, 2013

(65) Prior Publication Data
US 2014/0375082 A1    Dec. 25, 2014

(30) Foreign Application Priority Data

May 31, 2012   (JP) ................................. 2012-123974

(51) Int. Cl.
*B60J 7/00*   (2006.01)
*B62D 21/15*   (2006.01)
(Continued)

(52) U.S. Cl.
CPC .............. *B62D 21/152* (2013.01); *B60R 19/24* (2013.01); *B60R 19/34* (2013.01); *B60R 2019/1806* (2013.01); *B60R 19/18* (2013.01)

(58) Field of Classification Search
CPC .... B60R 19/18; B60R 21/0136; B60R 21/34; B60R 19/34; B60R 19/483; B60R 19/26; B60R 19/30; B60R 19/32

USPC .............. 296/187.1, 187.03, 187.04, 187.09, 296/203.02; 180/274; 293/102, 117, 120, 293/121, 132, 133, 155, 118, 134, 135, 136, 293/137

See application file for complete search history.

(56) References Cited

U.S. PATENT DOCUMENTS 3,655,231 A * 4/1972 Killea, Jr. ...................... 293/132
3,789,944 A * 2/1974 Barenyi ........................ 180/68.6
(Continued)

FOREIGN PATENT DOCUMENTS

JP    2000-053022 A    2/2000
JP    2000-255450 A    9/2000
(Continued)

OTHER PUBLICATIONS

PCT/ISA/210 from International Application PCT/JP2013/060174, mailing date Jul. 9, 2013.

*Primary Examiner* — Kiran B Patel
(74) *Attorney, Agent, or Firm* — Carrier Blackman & Associates, P.C.; Joseph P. Carrier; William D. Blackman

(57) ABSTRACT

A front portion structure (2) of a vehicle body (1) includes: a pair of front side frames (11) that extend along a vehicle body front-rear direction on both sides in a vehicle width direction; a lower member (12) that extends along the vehicle body front-rear direction on the outside in the vehicle width direction of the front side frame (11); a bumper beam (13) provided in the front of the front side frame (11) and extending along the vehicle width direction; a bumper beam extension (14) provided between the front side frame (11) and the bumper beam (13); and a gusset (23) that connects a front end portion of the front side frame (11) and a front end portion of the lower member (12) and that is formed in a protrusion protruding forwardly, wherein the bumper beam (13) is configured to have a concave shape opening rearwardly and to be capable of fitting the gusset (23).

13 Claims, 8 Drawing Sheets

(51) Int. Cl.
   *B60R 19/24* (2006.01)
   *B60R 19/34* (2006.01)
   *B60R 19/18* (2006.01)

(56) References Cited

U.S. PATENT DOCUMENTS

| | | | | |
|---|---|---|---|---|
| 4,050,689 | A * | 9/1977 | Barton et al. | 293/110 |
| 4,061,386 | A * | 12/1977 | Chupick | 293/134 |
| 5,372,216 | A * | 12/1994 | Tsuji et al. | 180/274 |
| 6,695,393 | B1 * | 2/2004 | Aouadi et al. | 296/187.09 |
| 6,866,115 | B2 * | 3/2005 | Miyasaka | 180/311 |
| 6,866,333 | B2 * | 3/2005 | Saitou | 296/203.02 |
| 6,899,195 | B2 * | 5/2005 | Miyasaka | 180/312 |
| 6,957,846 | B2 * | 10/2005 | Saeki | 296/187.1 |
| 7,455,351 | B2 * | 11/2008 | Nakayama et al. | 296/193.1 |
| 7,513,329 | B2 * | 4/2009 | Nakashima et al. | 180/312 |
| 7,850,228 | B2 * | 12/2010 | Asai | 296/203.02 |
| 8,276,955 | B2 * | 10/2012 | Baccouche et al. | 293/133 |
| 8,398,154 | B1 * | 3/2013 | Nusier et al. | 296/187.1 |
| 8,419,116 | B2 * | 4/2013 | Boettcher et al. | 296/203.02 |
| 8,496,287 | B2 * | 7/2013 | Matsuura et al. | 296/187.09 |
| 2002/0040819 | A1 * | 4/2002 | Miyata | 180/68.5 |
| 2005/0046165 | A1 * | 3/2005 | Gomi et al. | 280/781 |
| 2006/0269809 | A1 * | 11/2006 | Sakai et al. | 429/26 |
| 2009/0315365 | A1 * | 12/2009 | Baccouche et al. | 296/205 |
| 2010/0171340 | A1 * | 7/2010 | Yasuhara et al. | 296/205 |

FOREIGN PATENT DOCUMENTS

| | | |
|---|---|---|
| JP | 2003-226266 A | 8/2003 |
| JP | 2004-066932 A | 3/2004 |
| JP | 2006-256518 A | 9/2006 |
| JP | 2012-081844 A | 4/2012 |

* cited by examiner

VEHICLE BODY FRAME STRUCTURE

TECHNICAL FIELD

The present invention relates to a vehicle body frame structure.

Priority is claimed on Japanese Patent Application No. 2012-123974 filed on May 31, 2012, the contents of which are incorporated herein by reference.

BACKGROUND

In the related art, for example, as a vehicle body front portion structure (vehicle body frame structure) used to absorb an impact from the vehicle front, a configuration is known which includes front side frames that extend along the front-rear direction on both sides in the vehicle width direction and a bumper beam that extends along the vehicle width direction in the front of the front side frames, and in which an impact absorption member connects a front end portion of the front side frames and the bumper beam.

According to this configuration, at the time of a vehicle front crash (hereinafter, referred to as a front collision), when an impact load is input from the vehicle front (bumper beam side), the impact load is absorbed by compressive deformation (buckling distortion) of the impact absorption member.

However, at the time of a front collision, when an impact load is input to an outer portion of the bumper beam which is the portion positioned more outward in the vehicle width direction than the front side frames (when a so-called narrow offset collision occurs), there may be a case where a local bending of only the outer portion just occurs, an impact load does not efficiently transmit to the impact absorption member, the front side frame, and the like, and the impact load is difficult to be absorbed.

Accordingly, a configuration in which a diagonal beam that diagonally extends more outwardly in the vehicle width direction toward the front is provided on an intermediate portion in the front-rear direction in the front side frame and an front end portion of this diagonal beam is connected to or, with a predetermined distance, faces an end portion in the vehicle width direction of the bumper beam is disclosed (for example, refer to Patent Document 1 to 4).

According to this configuration, since the local bending of the diagonal beam is suppressed and the impact load is transmitted to the front side frame, the impact load can be effectively absorbed.

RELATED ART DOCUMENTS

Patent Documents

[Patent Document 1] Japanese Unexamined Patent Application, First Publication No. 2000-53022

[Patent Document 2] Japanese Unexamined Patent Application, First Publication No. 2000-255450

[Patent Document 3] Japanese Unexamined Patent Application, First Publication No. 2003-226266

[Patent Document 4] Japanese Unexamined Patent Application, First Publication No. 2004-66932

SUMMARY OF INVENTION

Problems to be Solved by the Invention

However, in the above-described configuration of the related art, there is a problem that, by the addition of the diagonal frame, the structure of the front side frame becomes complex and also an increase of the number of the components leads to an increase of a production cost or a weight.

In view of the above, an aspect of the present invention aims to provide a vehicle body frame structure capable of efficiently absorbing an impact load at the time of a narrow offset collision, in addition to enabling cost reduction and weight saving.

Means for Solving the Problem

In a vehicle body frame structure according to an aspect of the present invention, the following configurations are employed in order to achieve the aforementioned object.

(1) A vehicle body frame structure according to an aspect of the present invention includes: a pair of side frames that extend along a vehicle body front-rear direction on both sides in a vehicle width direction; a subframe that extends along the vehicle body front-rear direction on the outside in the vehicle width direction of the side frame; a bumper beam provided on the outside in the vehicle body front-rear direction of the side frame and extending along the vehicle width direction; an impact absorption member provided between the side frame and the bumper beam; and a fit member that connects an outer end portion in the vehicle body front-rear direction of the side frame and an outer end portion in the vehicle body front-rear direction of the subframe and that is formed in a protrusion protruding outwardly in the vehicle body front-rear direction, wherein the bumper beam is configured to extend more outwardly in the vehicle width direction than the side frame, to have a concave shape opening inwardly in the vehicle body front-rear direction, and to be capable of fitting the fit member.

(2) In the aspect of the above (1), the vehicle body frame structure may further include a bumper face that covers the bumper beam from the outside in the vehicle body front-rear direction, wherein a beam vertical wall of the bumper beam may be formed along an inner surface of the bumper face, and an inner edge in the vehicle body front-rear direction of a beam upper wall of the bumper beam and an inner edge in the vehicle body front-rear direction of a beam lower wall of the bumper beam may be formed along an outer surface of the fit member.

(3) In the aspect of the above (1) or (2), the bumper beam may be formed in a hat-like cross-sectional shape.

(4) In the aspect of any one of the above (1) to (3), the bumper beam may be formed by hot stamping.

(5) In the aspect of any one of the above (1) to (4), a bead that extends along the vehicle width direction may be formed in the beam vertical wall of the bumper beam.

(6) In the aspect of any one of the above (1) to (5), the fit member may be formed in a hat-like cross-sectional shape opening inwardly in the vehicle body front-rear direction; each of a boundary portion of a fit member upper wall of the fit member with a fit member flange section and a boundary portion of a fit member lower wall of the fit member with a fit member flange section may be formed as an inclined surface that inclines outwardly in a vehicle body up-down direction toward the inside in the vehicle body front-rear direction; and an inner edge in the vehicle body front-rear direction of a beam upper wall of the bumper beam and an inner edge in the vehicle body front-rear direction of a beam lower wall of the bumper beam may face the inclined surfaces in the vehicle body front-rear direction.

(7) In the aspect of the above (6), an outer portion of the inclined surface positioned outwardly in the vehicle width direction may be wider along the vehicle body front-rear direction than an inner portion of the inclined surface positioned inwardly in the vehicle width direction.

(8) In the aspect of any one of the above (1) to (7), the impact absorption member may be configured to be capable of being deformed compressively in the vehicle body front-rear direction, and a deformation amount along the vehicle body front-rear direction of the impact absorption member may be substantially the same as a distance along the vehicle body front-rear direction between an inner end portion in the vehicle body front-rear direction of the bumper beam and an inner end portion in the vehicle body front-rear direction of the fit member.

(9) In the aspect of any one of the above (1) to (8), the fit member may be configured as a gusset that connects an outer end portion in the vehicle body front-rear direction of the side frame and an outer end portion in the vehicle body front-rear direction of the subframe.

(10) In the aspect of any one of the above (1) to (9), a work aperture used for spot welding between the fit member and the side frame may be formed in a portion of a fit member vertical wall of the fit member which is the portion that overlaps in the vehicle body front-rear direction with the side frame, and a work aperture used for spot welding between the fit member and the subframe may be formed in a portion of a fit member vertical wall of the fit member which is the portion that overlaps in the vehicle body front-rear direction with the subframe.

(11) In the aspect of any one of the above (1) to (10), the bumper beam may be formed in a hat-like cross-sectional shape; a protruding portion that protrudes inwardly in the vehicle body front-rear direction may be formed in a beam flange section of the bumper beam; and a groove portion that accommodates the protruding portion may be formed in a portion of the fit member which is the portion that overlaps in the vehicle body front-rear direction with the protruding portion.

(12) In the aspect of any one of the above (1) to (11), an inner end portion in the vehicle body front-rear direction of the impact absorption member may be joined to the fit member at an outward position in the vehicle width direction relative to the side frame, and an inner end portion in the vehicle body front-rear direction of the impact absorption member may be joined to a connection member that connects a bulkhead and the side frame at an inward position in the vehicle width direction relative to the side frame.

(13) In the aspect of any one of the above (1) to (12), the bumper beam may be formed in a hat-like cross-sectional shape; the impact absorption member comprises a bumper beam installation plate having a U shape in cross-sectional view and provided along an inner surface of the bumper beam; and both end portions in the vehicle width direction of a plate upper wall of the bumper beam installation plate may be provided with a connection step section that protrudes outwardly in a vehicle body up-down direction from the plate upper wall, and both end portions in the vehicle width direction of a plate lower wall of the bumper beam installation plate may be provided with a connection step section that protrudes outwardly in the vehicle body up-down direction from the plate lower wall.

Advantage of the Invention

According to the aspect of the above (1), when an impact load at the time of a narrow offset collision is input to an outer portion of the bumper beam which is the portion positioned more outward in the vehicle width direction than the side frame, the outer portion of the bumper beam bends inwardly in the vehicle body front-rear direction such that a connection portion between the bumper beam and the impact absorption member is a fulcrum.

Thereby, the bumper beam and the fit member relatively approach each other, the bumper beam overlaps the fit member from the outside in the vehicle body front-rear direction, and thereby the fit member fits the inside of the bumper beam. As a result, bending of the bumper beam is restricted, and the impact load is absorbed by the subframe through the fit member.

On the other hand, when bending of the bumper beam is restricted, part of the impact load is transmitted toward the central portion in the vehicle width direction of the bumper beam and is transmitted to the impact absorption member.

Thereby, the impact absorption member is deformed. Thus, the impact load is absorbed, and the connection portion of the bumper beam with the impact absorption member moves inwardly in the vehicle body front-rear direction. In other words, the overall outer portion of the bumper beam moves inwardly in the vehicle body front-rear direction and fits the fit member, and the remaining impact load of the impact load is absorbed by the side frame through the fit member.

According to the configuration above, the bumper beam and the fit member are configured to be capable of fitting to each other when an impact load is input, and therefore it is possible to restrict local bending of the bumper beam and to transmit the impact load efficiently toward the impact absorption member, the side frame, the subframe, and the like. Accordingly, it is possible to absorb the impact load efficiently even at the time of a narrow offset collision.

In addition, since the configuration is a simple configuration in which the bumper beam having a concave shape and the protrusive fit member are configured to be capable of fitting to each other, it is possible to achieve cost reduction and weight saving in comparison with a configuration of the related art in which a diagonal beam is provided on a front side frame that is a skeletal member, a configuration of the related art in which a bumper beam having a closed cross-sectional structure is adopted, or the like.

Moreover, since the bumper beam is formed in a concave shape opening inwardly in the vehicle body front-rear direction, it is possible to increase the length in the front-rear direction of the impact absorption member without changing the distance between the outer end portion in the vehicle body front-rear direction of the side frame and the outer end portion in the vehicle body front-rear direction of the bumper beam, in comparison with a case of the related art in which a bumper beam having a closed cross-sectional structure is adopted.

Thereby, in addition to suppressing an increase in size, it is possible to increase an impact absorption amount by the impact absorption member (a deformation amount of the impact absorption member), and it is possible to absorb the impact load further efficiently.

According to the aspect of the above (2), the bumper beam is formed along the shape of the bumper face and the shape of the fit member, and thereby it is possible to improve design flexibility in the external form of the vehicle body, the side frame, the subframe, or the like.

According to the aspect of the above (3), the bumper beam is formed in a hat-like cross-sectional shape, and thereby it is possible to produce the bumper beam easily by press working.

According to the aspect of the above (4), the bumper beam is formed by hot stamping, and thereby it is possible to improve the strength of the bumper beam.

By improving the strength of the bumper beam, it is possible to suppress the local bending in which the connection portion of the bumper beam with the impact absorption member is the fulcrum. In this case, it is possible to transmit the impact load efficiently toward the impact absorption member and the like, and to move the overall outer portion of the bumper beam inwardly in the vehicle body front-rear direction in association with the deformation of the impact absorption member.

Thereby, it is possible to absorb the impact load efficiently by the deformation of the impact absorption member, and also to transmit the remaining impact load efficiently toward the side frame, the subframe, and the like.

According to the aspect of the above (5), since the bead is formed in the beam vertical wall of the bumper beam, it is possible to improve the rigidity of the bumper beam.

By improving the rigidity of the bumper beam, it is possible to suppress the local bending in which the connection portion of the bumper beam with the impact absorption member is the fulcrum. In this case, it is possible to transmit the impact load efficiently toward the impact absorption member and the like, and to move the overall outer portion of the bumper beam inwardly in the vehicle body front-rear direction in association with the deformation of the impact absorption member.

Thereby, it is possible to absorb the impact load efficiently by the deformation of the impact absorption member, and also to transmit the remaining impact load efficiently toward the side frame, the subframe, and the like.

According to the aspect of the above (6), since the inner edge in the vehicle body front-rear direction of the beam upper wall of the bumper beam and the inner edge in the vehicle body front-rear direction of the beam lower wall of the bumper beam face the inclined surfaces of the fit member in the front-rear direction, when the bumper beam fits the fit member, the inclined surface is flexurally deformed inwardly in the up-down direction. Namely, since the bumper beam and the fit member can be closely fitted by a spring effect of the inclined surface, it is possible to reliably restrict the bending of the bumper beam, and also it is possible to reliably transmit the impact load.

According to the aspect of the above (7), since the width in the outer portion of the inclined surface is greater than the width in the inner portion of the inclined surface, the above-described spring effect is achieved dominantly in the outer portion of the fit member. Thereby, it is possible to absorb the impact load in the outer portion of the fit member when the bumper beam and the fit member are fitted.

Accordingly, since the impact load can be absorbed without deforming the impact absorption member, the side frame, the subframe, and the like when a relatively small impact load is input such as at the time of a light collision, it is possible to reduce a repair cost.

According to the aspect of the above (8), since the deformation amount along the vehicle body front-rear direction of the impact absorption member is substantially the same as the distance between the inner end portion in the vehicle body front-rear direction of the bumper beam and the inner end portion in the vehicle body front-rear direction of the fit member, a timing when the fitting of the fit member into the inside of the bumper beam is completed becomes substantially the same as a timing when the compressive deformation of the impact absorption member is completed.

Accordingly, since the impact load can be efficiently absorbed between the bumper beam and the fit member, it is possible to suppress the deformation of the side frame and the subframe, and it is possible to reduce a repair cost.

According to the aspect of the above (9), since the fit member is configured as the gusset that bridges the outer end portion in the vehicle body front-rear direction of the side frame and the outer end portion in the vehicle body front-rear direction of the subframe, it is possible to suppress an increase of the number of components in comparison with a case in which a fit member of a different body is provided, and also to improve the rigidity of the vehicle body.

According to the aspect of the above (10), since the work apertures used for spot welding are formed in the portion of the fit member vertical wall which is the portion that overlaps in the front-rear direction with the side frame and in the portion of the fit member vertical wall which is the portion that overlaps in the front-rear direction with the subframe, it becomes easy to attach the fit member to the side frame and the subframe.

According to the aspect of the above (11), the protruding portion formed in the beam flange section is accommodated within the groove portion formed in the fit member flange section when the bumper beam and the fit member are fitted. Thereby, the bumper beam and the gusset can be further easily and tightly fitted, and additionally, the displacement between the bumper beam and the gusset in the vehicle width direction can be suppressed.

According to the aspect of the above (12), it is possible to connect the impact absorption member easily and tightly.

According to the aspect of the above (13), since each of the plate upper wall and the plate lower wall includes the connection step section that protrudes outwardly in the up-down direction, it is possible to connect the impact absorption member to the bumper beam through this connection step section. Thereby, the production efficiency is improved, and mass production is enabled.

In addition, since the height along the up-down direction of the impact absorption member can be maximally secured within a range of a portion other than the connection step section of the plate upper wall and a portion other than the connection step section of the plate lower wall, it is possible to secure the cross-sectional area of the impact absorption member and to absorb the impact load effectively.

DESCRIPTION OF THE EMBODIMENTS

Figure 1:
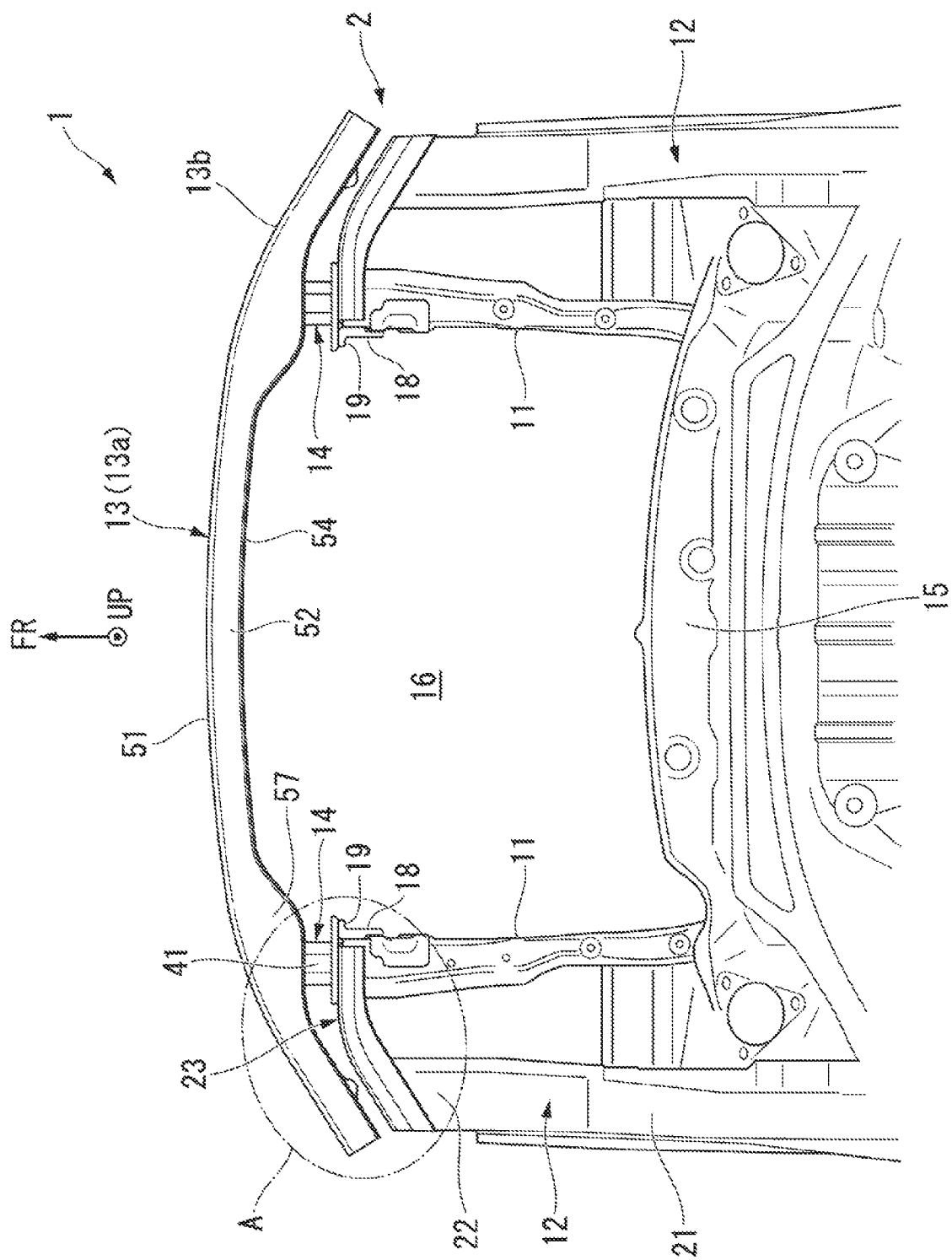
FIG. 1 is a plan view showing a vehicle body front portion.

Next, an embodiment of the present invention will be described based on the drawings. The present embodiment is described using an example in which a vehicle body frame structure of the present invention is applied to a front portion structure of a vehicle body. Note that, it is supposed that directions, such as front, rear, up, down, right, and left in the following description are the same as directions in a vehicle if there is no particular description. In addition, in the drawings, an arrow FR indicates the front of the vehicle (the outside in the vehicle body front-rear direction), and an arrow UP indicates the upper side of the vehicle. FIG. 1 is a plan view showing a vehicle body front portion according to the present embodiment, and FIG. 2 is an enlarged plan view of an A portion of FIG. 1.

Figure 2:
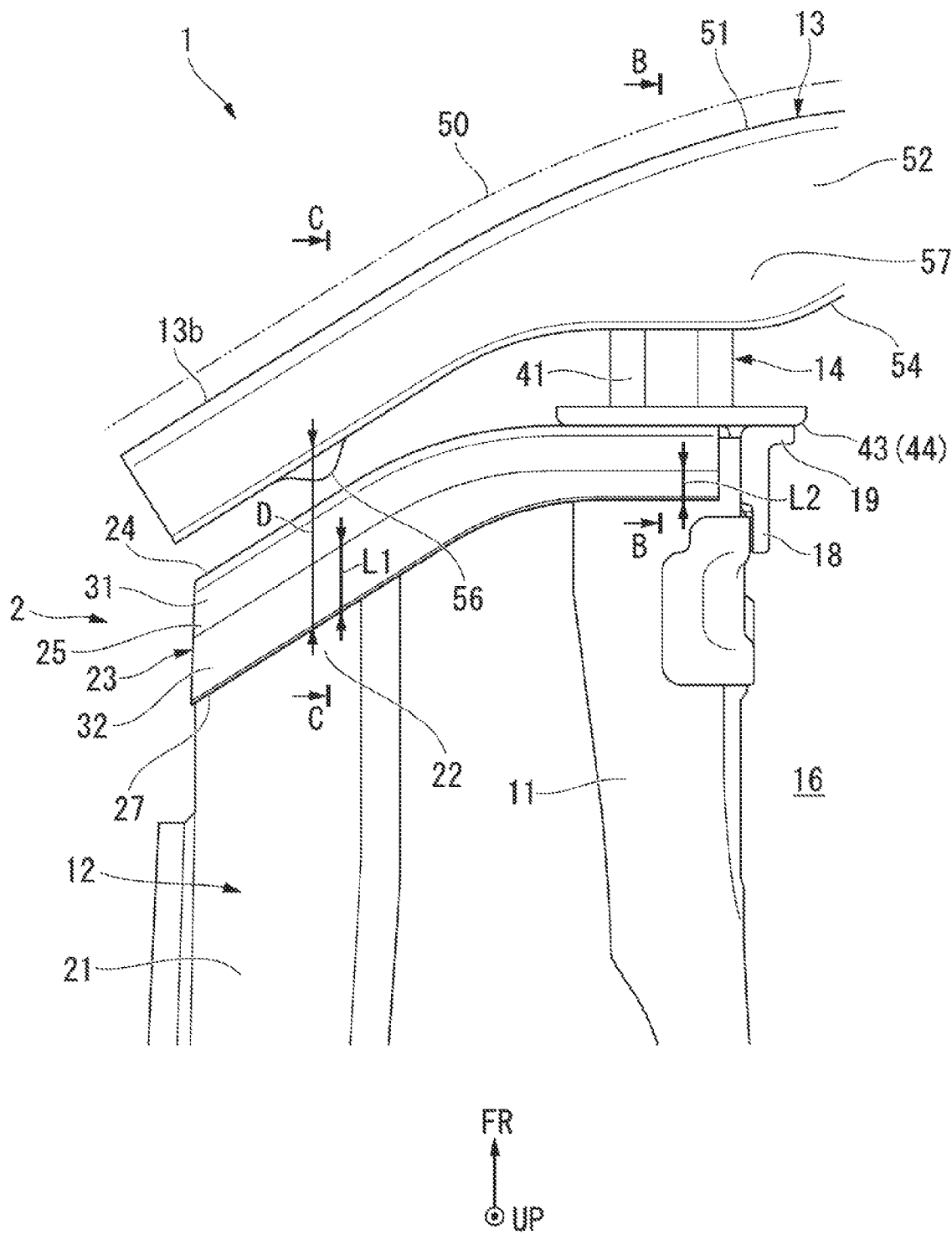
FIG. 2 is an enlarged plan view of an A portion of FIG. 1.

As shown in FIG. 1 and FIG. 2, a front portion structure (vehicle body frame structure) 2 of a vehicle body 1 according to the present embodiment includes: a pair of front side frames (side frame) 11 that extend along a front-rear direction on both sides in a vehicle width direction; a pair of lower members (subframe) 12 that extend along the front-rear direction and are located outwardly in the vehicle width direction relative to each front side frame 11; a bumper beam 13 provided on the front of the front side frame 11 and extending along the vehicle width direction; and a bumper beam extension (impact absorption member) 14 provided between the front side frame 11 and the bumper beam 13.

Note that, the vehicle body 1 of the present embodiment is divided in the front-rear direction by a dashboard 15 into an inside of a vehicle interior (not shown in the drawing) and an engine room 16.

The front side frame 11 is a skeletal member provided on both sides of a lower portion of the engine room 16 and has a closed cross-sectional structure having a rectangular shape in cross-sectional view. Note that, a front end portion of the front side frame 11 is open toward the front.

Figure 3:
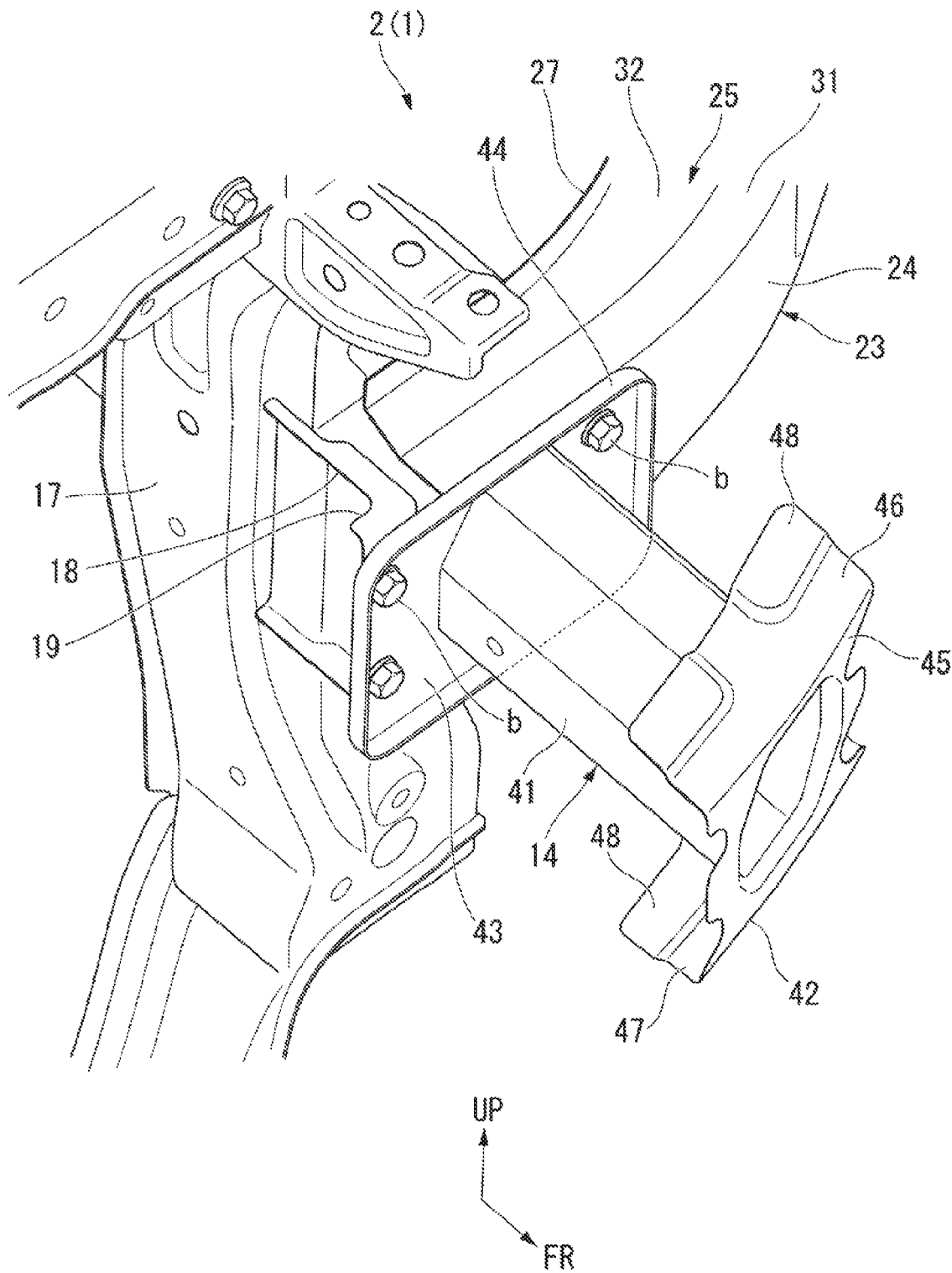
FIG. 3 is a perspective view looking from the inside in the vehicle width direction at the vehicle body front portion.
Figure 4:
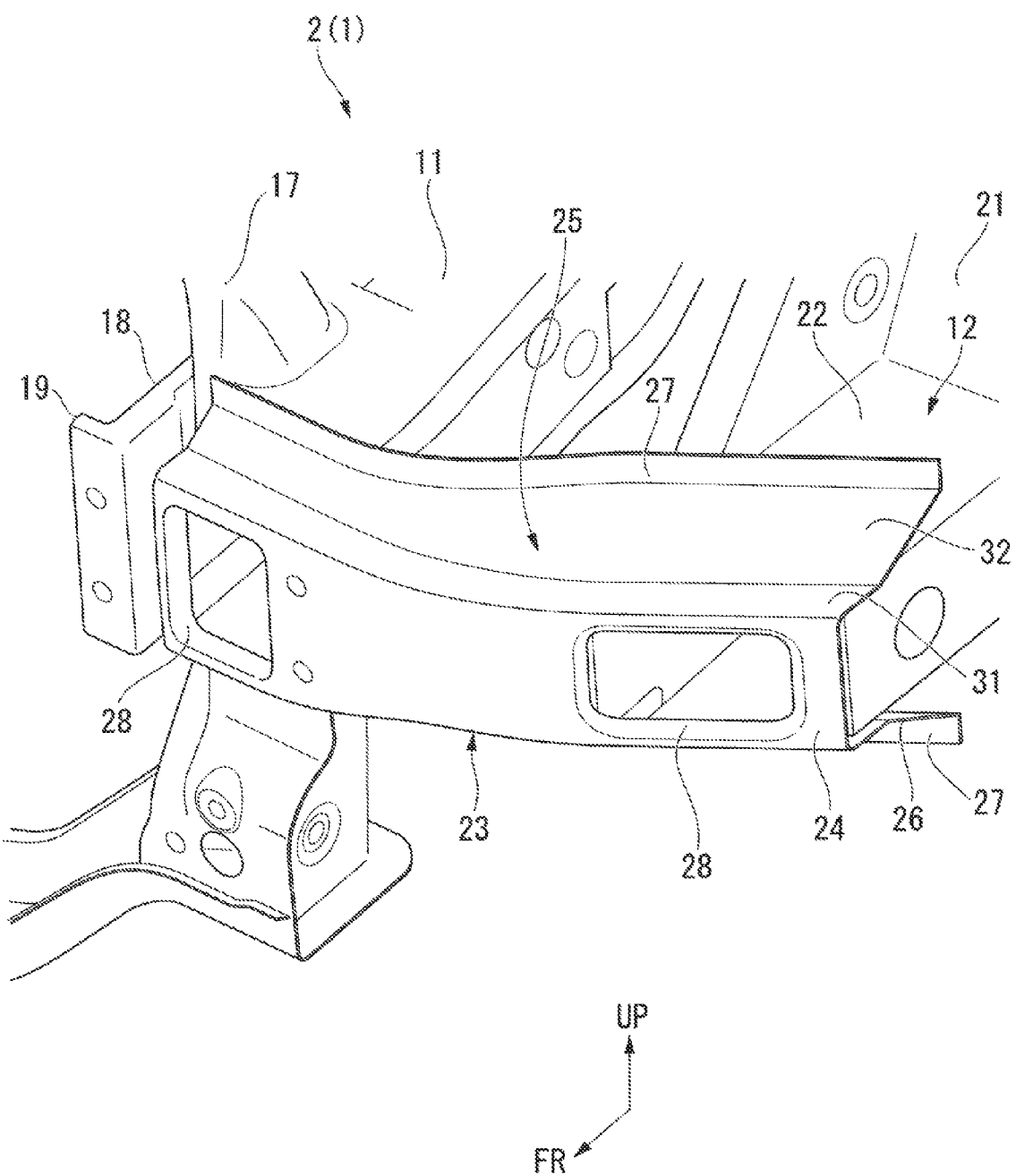
FIG. 4 is a perspective view looking from the outside in the vehicle width direction at the vehicle body front portion.

FIG. 3 is a perspective view looking from the inside in the vehicle width direction at the vehicle body front portion, and FIG. 4 is a perspective view looking from the outside in the vehicle width direction at the vehicle body front portion. Note that, the bumper beam 13 is omitted in FIG. 3, and the bumper beam 13 and the bumper beam extension 14 are omitted in FIG. 4.

As shown in FIG. 3 and FIG. 4, a front bulkhead (bulkhead) 17 is provided on the inside in the vehicle width direction of the front end portion of each front side frame 11. This front bulkhead 17 is formed in a frame shape opening forwardly and rearwardly, and a radiator or the like (not shown in the drawing) is supported on the inside of the front bulk head. In the front bulkhead 17, a sidewall that faces the outside in the vehicle width direction of the front bulkhead is connected to a sidewall that faces the inside in the vehicle width direction of the front side frame 11 via a connection member 18.

The connection member 18 is a member having an L shape in planar view. A rear end portion of the connection member is fixed to the sidewall of the front side frame 11, and a front end portion of the connection member constitutes a bent part 19 that is bent inwardly in the vehicle width direction. Note that, the bent part 19 is arranged to be substantially flush with a front end aperture edge of the front side frame 11.

As shown in FIG. 2 and FIG. 4, the lower member 12 is a member having a closed cross-sectional structure and has a rearward curved section 21 that extends downwardly while curving toward the front from the rear (inside in the vehicle body front-rear direction) and a forward extension section 22 that extends forwardly along the above-described front side frame 11 from a front end portion of the rearward curved section 21.

A front end aperture edge of the lower member 12 (forward extension section 22) is positioned more rearwardly than the front side frame 11 and also slopes rearwardly toward the outside from the inside in the vehicle width direction.

As shown in FIG. 2, the front end portion of the front side frame 11 and the front end portion of the lower member 12 which are adjacent in the vehicle width direction, of the pair of the front side frames 11 and the pair of the lower members 12, are provided with a gusset (fit member) 23 that connects the front end portions. The gusset 23 extends rearwardly toward the outside from the inside in the vehicle width direction in planar view and also has a curved shape protruding forwardly.

Figure 5:
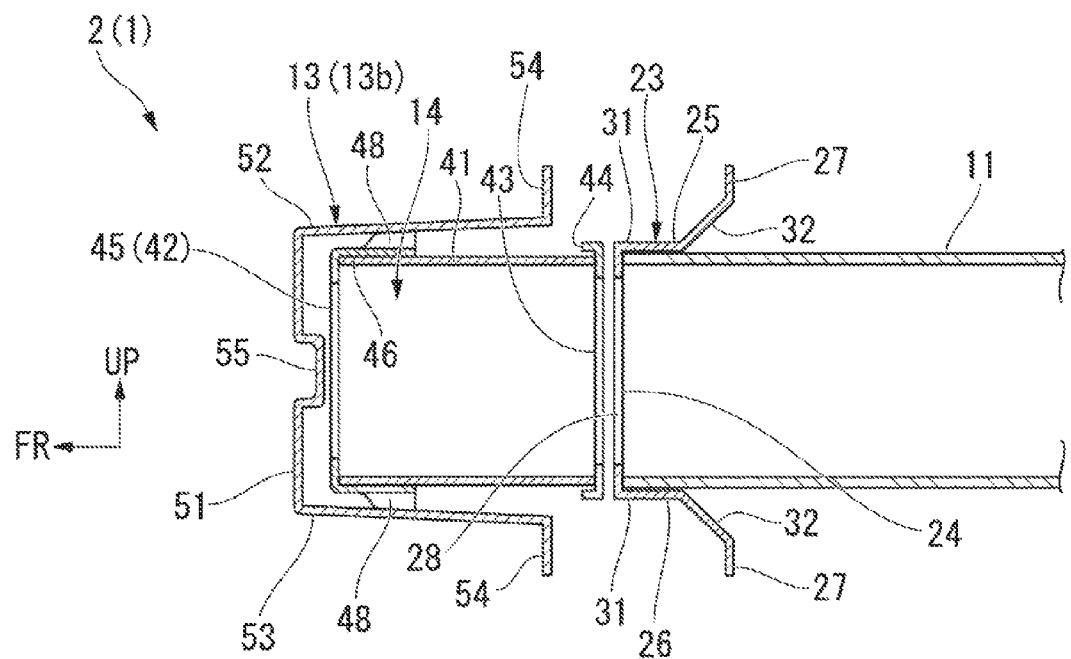
FIG. 5 is a cross-sectional view along a B-B line of FIG. 2.
Figure 6:
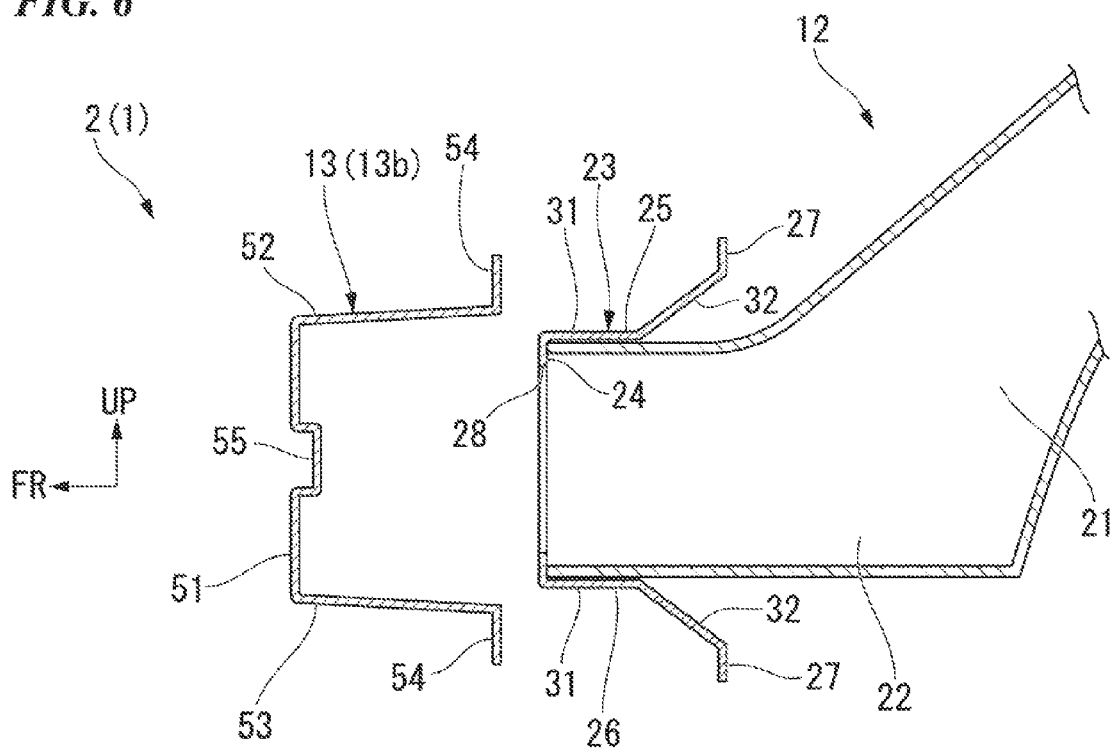
FIG. 6 is a cross-sectional view along a C-C line of FIG. 2.

FIG. 5 is a schematic cross-sectional view along a B-B line of FIG. 2, and FIG. 6 is a schematic cross-sectional view along a C-C line of FIG. 2.

As shown in FIG. 2 and FIGS. 4 to 6, the cross section seen from the vehicle width direction of the gusset 23 is formed in a hat-like cross-sectional shape protruding forwardly, and the front end portion of the front side frame 11 and the front end portion of the lower member 12 (forward extension section 22) are arranged on the inside of the gusset.

Specifically, the gusset 23 includes, in cross-sectional view, a gusset vertical wall (fit member vertical wall) 24 that extends in an up-down direction ahead of the front side frame 11 and the lower member 12; a gusset upper wall (fit member upper wall) 25 and a gusset lower wall (fit member lower wall) 26 that extend rearwardly from an upper end edge and an lower end edge of the gusset vertical wall 24, respectively; and a pair of gusset flange sections (fit member flange section) 27 that extend outwardly in the up-down direction (in a direction away from the gusset upper wall 25 and the gusset lower wall 26 which face each other in the up-down direction) from a rear end edge of the gusset upper wall 25 and a rear end edge of the gusset lower wall 26, respectively.

A work aperture 28 in communication with the inside of the front end aperture of the front side frame 11 is formed in a portion of the gusset vertical wall 24 which is the portion that overlaps in the front-rear direction with the front side frame 11. A work aperture 28 in communication with the inside of the front end aperture of the lower member 12 is formed in a portion of the gusset vertical wall 24 which is the portion that overlaps in the front-rear direction with the lower member 12.

The gusset upper wall 25 of the gusset 23 is joined by spot welding to the front side frame 11 through the work aperture 28, and the gusset lower wall 26 of the gusset 23 is joined by spot welding to the lower member 12 through the work aperture 28.

The gusset upper wall 25 and the gusset lower wall 26 are formed vertically symmetrically with respect to the gusset vertical wall 24 and face each other in the up-down direction interposing the front side frame 11 and the lower member 12. Each of the gusset upper wall 25 and the gusset lower wall 26 has a flat plate section 31 positioned at a front end portion and an inclined surface 32 positioned at a rear end portion.

A portion of the flat plate section 31 which is the portion that overlaps in the up-down direction with the front side frame 11 is joined by spot welding to the front side frame 11 through the work aperture 28. A portion of the flat plate section 31 which is the portion that overlaps in the up-down direction with the lower member 12 is joined by spot welding to the lower member 12 through the work aperture 28.

The inclined surface 32 extends outwardly in the up-down direction toward the rear from a rear end edge of the flat plate section 31. Accordingly, each inclined surface 32 has a gap between the inclined surface and the front side frame 11 and a gap between the inclined surface and the lower member 12.

In addition, a width L1 along the front-rear direction in an outer portion of the inclined surface 32 positioned outwardly in the vehicle width direction is greater than a width L2 in an inner portion of the inclined surface 32 positioned inwardly in the vehicle width direction (L1>L2 in FIG. 2). Specifically, a width along the front-rear direction in an intermediate portion in the vehicle width direction of the inclined surface 32 gradually enlarges toward the outside from the inside in the vehicle width direction.

A groove portion 33 (refer to FIG. 7) having a rearwardly concave shape is formed in an outer portion positioned outwardly in the vehicle width direction (specifically, a portion that overlaps in the front-rear direction with the lower member 12) in the gusset flange section 27 of the gusset lower wall 26, of the respective gusset flange sections 27.

As shown in FIG. 3, the bumper beam extension 14 includes a tube section 41 that extends along the front-rear direction, a bumper beam installation plate 42 connected to a front end portion of the tube section 41, and a gusset installation plate 43 connected to a rear end portion of the tube section 41.

The gusset installation plate 43 is arranged on the opposite side (front) of the front side frame 11 so as to interpose the gusset 23. The gusset installation plate 43 is joined to the gusset vertical wall 24 via a bolt b at an outward position in the vehicle width direction relative to the front side frame 11 and is joined to the bent part 19 of the connection member 18 via a bolt b at an inward position in the vehicle width direction relative to the front side frame 11.

In addition, on the outer peripheral edge of the gusset installation plate 43, a peripheral wall section 44 configured by the plate that is forwardly bent is provided to stand.

The tube section 41 is a member having a closed cross-sectional structure of a polygonal shape in cross-sectional view and is configured to be capable of being deformed compressively (buckling distortion) in the front-rear direction when an impact load F described below is input. The tube section 41 extends along an extended line along the extending direction of the front side frame 11, and a rear end portion of the tube section is connected to a central portion in the vehicle width direction in the gusset installation plate 43.

As shown in FIG. 3, the bumper beam installation plate 42 is formed in a U shape in cross-sectional view seen from the vehicle width direction and includes a main body section 45 that projects outwardly from an front end aperture edge of the tube section 41, a plate upper wall 46 configured by the main body section that is rearwardly bent at an upper end edge of the main body section 45, and a plate lower wall 47 configured by the main body section that is rearwardly bent at a lower end edge of the main body section 45.

The plate upper wall 46 and the plate lower wall 47 face each other in the up-down direction interposing the tube section 41. A connection step section 48 that protrudes outwardly in the up-down direction is formed in both end portions in the vehicle width direction of the plate upper wall 46 and the plate lower wall 47.

Figure 7:
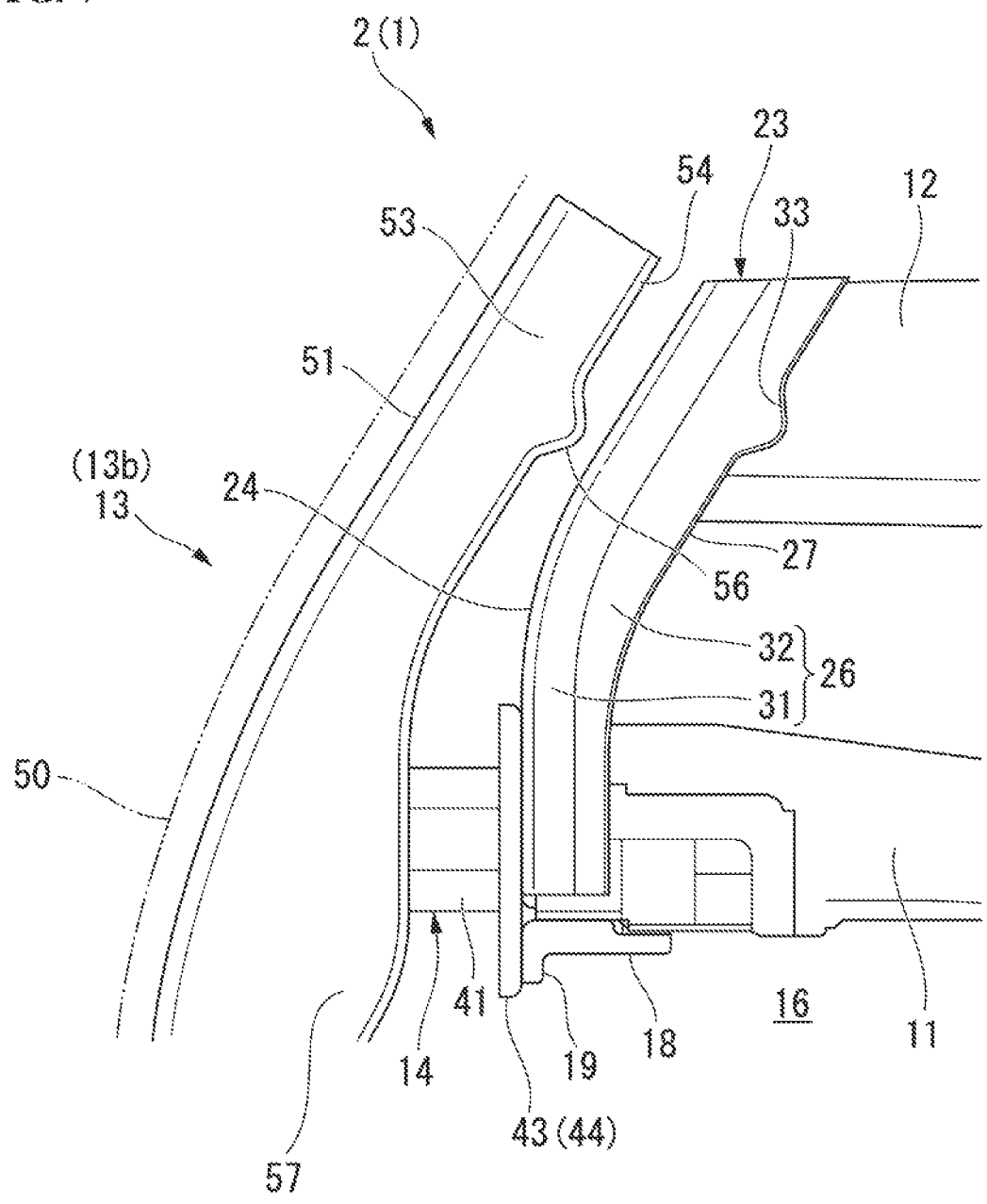
FIG. 7 is an enlarged bottom plan view of the A portion of FIG. 1.

FIG. 7 is an enlarged bottom plan view of the A portion of FIG. 1.

As shown in FIG. 1, FIG. 2, and FIGS. 5 to 7, the bumper beam 13 is formed by press working of a steel plate or the like using hot stamping (hot pressing) or the like, has a curved shape protruding forwardly in planar view, and extends rearwardly toward the outside from the central portion in the vehicle width direction.

Specifically, a central portion 13a positioned at the central portion in the vehicle width direction of the bumper beam 13 is provided so as to bridge the respective bumper beam extensions 14 described above, and an outer portion 13b positioned outwardly in the vehicle width direction relative to each bumper beam extension 14 is configured to be a free end (in a cantilever form).

In this case, the outer portion 13b of the bumper beam 13 extends to a position that overlaps with the lower member 12 when looking from the front-rear direction. Note that, in the vehicle body 1 of the present embodiment, a bumper face 50 (refer to FIG. 2) that constitutes an outer surface is provided so as to cover the bumper beam 13 from the front.

The cross section seen from the vehicle width direction of the bumper beam 13 is formed in a hat-like cross-sectional shape opening rearwardly, and the front end portion of the bumper beam extension 14 described above is arranged on the inside of the bumper beam.

Specifically, the bumper beam 13 includes, in cross-sectional view, a beam vertical wall 51 that extends in the up-down direction ahead of the front side frame 11 and the lower member 12; a beam upper wall 52 and a beam lower wall 53 that extend rearwardly from an upper end edge of the beam vertical wall 51 and an lower end edge of the beam vertical wall 51, respectively; and a pair of beam flange sections 54 that extend outwardly in the up-down direction relative to the beam upper wall 52 and the beam lower wall 53 from a rear end edge of the beam upper wall 52 and a rear end edge of the beam lower wall 53, respectively.

The bumper beam 13 is configured to be capable of fitting the gusset 23 by relatively approaching the gusset 23 when an impact load F described below is input.

A front surface of the beam vertical wall 51 is formed along an inner surface (rear surface) of the bumper face 50 described above. In addition, a bead 55 having a rearwardly concave shape is formed in a central portion in the up-down direction of the beam vertical wall 51 over the whole in the vehicle width direction.

The beam upper wall 52 and the beam lower wall 53 are formed vertically symmetrically with respect to the beam vertical wall 51 and incline outwardly in the up-down direction toward the rear from the front. Each of the beam upper wall 52 and the beam lower wall 53 is connected by spot welding to each connection step section 48 of the bumper beam installation plate 42 described above. Thereby, the bumper beam 13 is connected to the bumper beam extension 14.

Namely, the beam upper wall 52 is in contact with the connection step section 48 of the plate upper wall 46. On the other hand, the beam upper wall 52 has s a gap between the beam upper wall and a portion other than the connection step section 48. The beam lower wall 53 is in contact with the connection step section 48 of the plate lower wall 47. On the other hand, the beam lower wall 53 has s a gap between the beam lower wall and a portion other than the connection step section 48.

In addition, the rear end edge of the beam upper wall 52 faces the inclined surface 32 of the gusset upper wall 25 in the front-rear direction. The rear end edge of the beam lower wall 53 faces the inclined surface 32 of the gusset lower wall 26 in the front-rear direction.

In addition, in a portion of each of the beam upper wall 52 and the beam lower wall 53 which is the portion that overlaps in planar view with the bumper beam extension 14, an enlarged section 57 having an enlarged width in the front-rear direction in comparison with other portions is formed. A rear end edge of the enlarged section 57 is located in an intermediate portion in the extending direction of the tube section 41 in the bumper beam extension 14.

In this case, a portion facing the gusset 23 which is the portion of a rear end edge of the bumper beam 13 (the outer portion 13b of the bumper beam 13 and the rear end edge of the enlarged section 57) extends along the gusset 23. Therefore, a distance D along the front-rear direction between the portion facing the gusset 23 which is the portion of the rear end edge of the bumper beam 13 and a rear end edge of the gusset 23 is substantially constant along the vehicle width direction.

In addition, the distance between the rear end edge of the bumper beam 13 and the rear end edge of the gusset 23 is substantially the same as the deformation amount along the front-rear direction of the tube section 41 described above.

A protruding portion 56 that protrudes rearwardly is formed in a portion positioned outwardly in the vehicle width direction (specifically, a portion that overlaps in the front-rear direction with the lower member 12) in the beam flange section 54 of the beam lower wall 53, of the respective beam flange sections 54. This protruding portion 56 is configured to be capable of being accommodated within the groove portion 33 of the gusset 23 described above when the bumper beam 13 fits the gusset 23.

Next, an operation of the above-described front portion structure 2 will be described. In the following description, a case in which, at the time of a front collision, the impact load F is input to a portion of the bumper beam 13 (the outer portion 13b) positioned more outward in the vehicle width direction than the front side frame 11, namely when a so-called narrow offset collision occurs, will be described.

Figure 8:
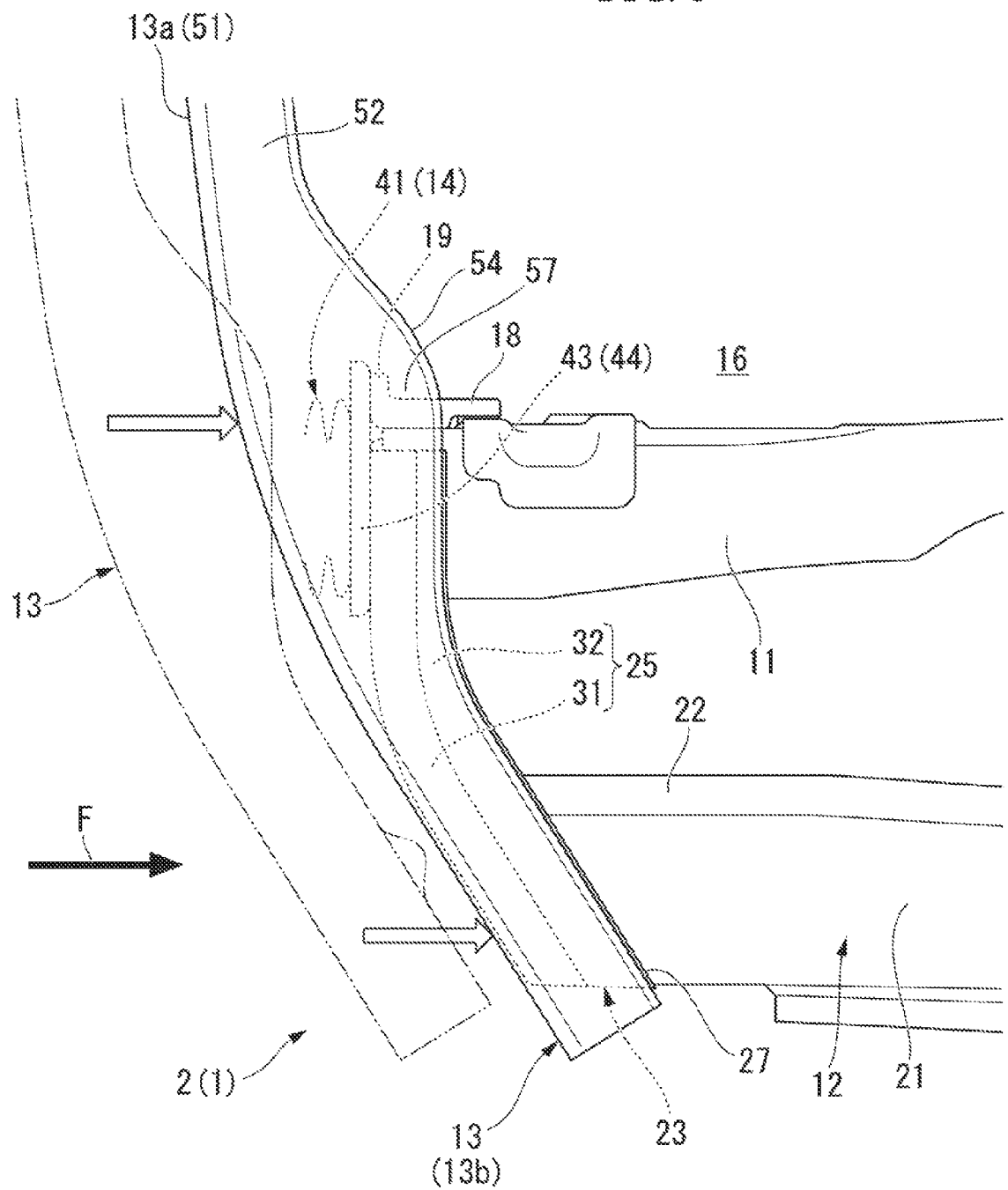
FIG. 8 is an explanation drawing used to describe an operation at the time of a narrow offset collision and is a schematic plan view corresponding to FIG. 2.
Figure 9:
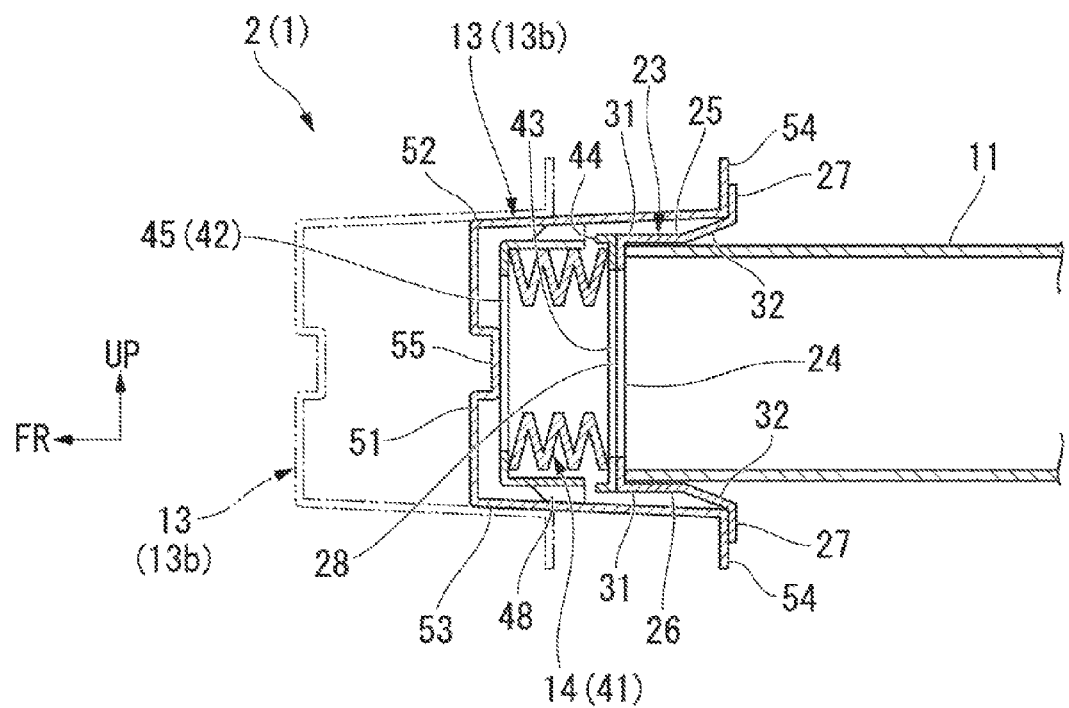
FIG. 9 is an explanation drawing used to describe an operation at the time of a narrow offset collision and is a schematic cross-sectional view corresponding to FIG. 5.
Figure 10:
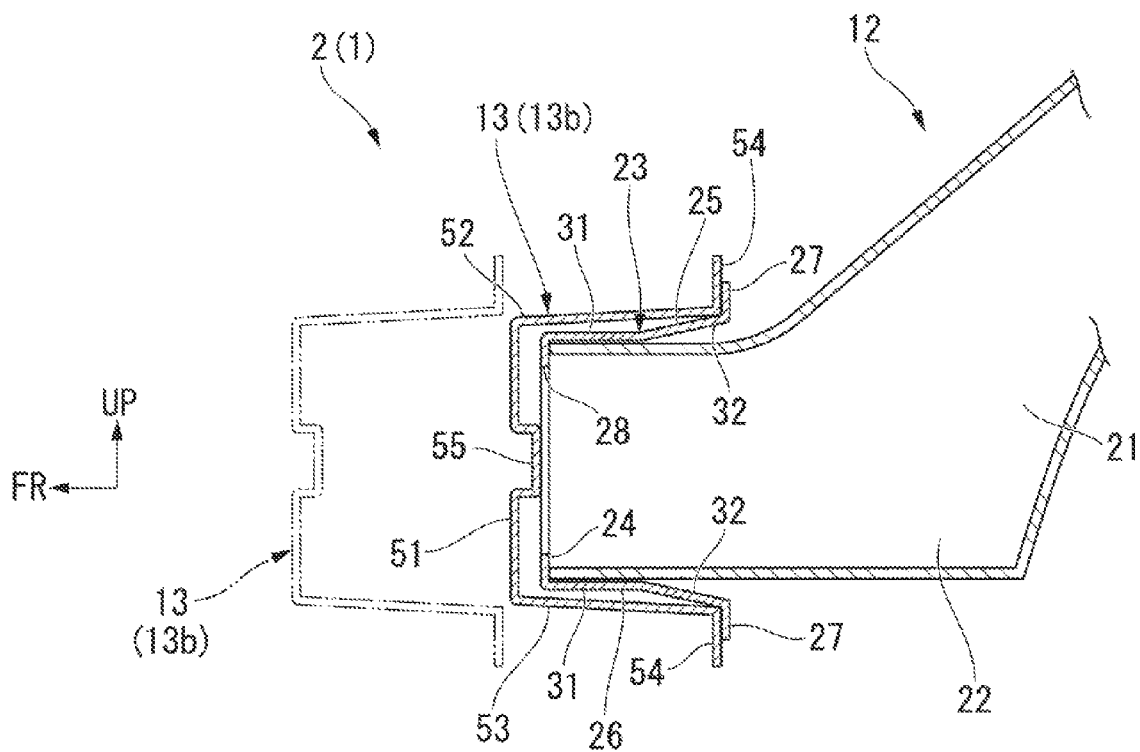
FIG. 10 is an explanation drawing used to describe an operation at the time of a narrow offset collision and is a schematic cross-sectional view corresponding to FIG. 6.

FIGS. 8 to 10 are explanation drawings used to describe an operation at the time of a narrow offset collision. FIG. 8 is a schematic plan view corresponding to FIG. 2. FIG. 9 is a schematic cross-sectional view corresponding to FIG. 5. FIG. 10 is a schematic cross-sectional view corresponding to FIG. 6.

As shown in FIGS. 8 to 10, when the impact load F at the time of a narrow offset collision is input to the outer portion 13b of the bumper beam 13, the outer portion 13b of the bumper beam 13 bends rearwardly such that the connection portion between the bumper beam and the bumper beam extension 14 is a fulcrum.

Thereby, the bumper beam 13 and the gusset 23 relatively approach each other (refer to the solid line in FIG. 10), the bumper beam 13 overlaps the gusset 23 from the front, and thereby the gusset 23 fits the inside of the bumper beam 13. As a result, bending of the bumper beam 13 is restricted, and the impact load F is absorbed by the lower member 12 through the gusset 23.

On the other hand, when bending of the bumper beam 13 is restricted, part of the impact load F is transmitted toward the central portion 13a of the bumper beam 13 and is transmitted to the bumper beam extension 14.

Thereby, the tube section 41 of the bumper beam extension 14 is compressively deformed. Thus, the impact load F is absorbed, and the connection portion of the bumper beam 13 with the bumper beam extension 14 moves rearwardly. In other words, the overall outer portion 13b of the bumper beam 13 moves rearwardly and fits the gusset 23.

Then, a remaining impact load F of the impact load F is absorbed by the front side frame 11 through the gusset 23.

Thus, according to the present embodiment, since the bumper beam 13 and the gusset 23 are configured to be capable of fitting to each other when the impact load F is input, it is possible to restrict local bending of the bumper beam 13 and to transmit the impact load F efficiently toward the bumper beam extension 14, the front side frame 11, the lower member 12, and the like. Accordingly, it is possible to absorb the impact load F efficiently even at the time of a narrow offset collision.

In addition, since the configuration is a simple configuration in which the bumper beam 13 having a hat-like cross-sectional shape and the gusset 23 are configured to be capable of fitting to each other, it is possible to achieve cost reduction and weight saving in comparison with a configuration of the related art in which a diagonal beam is provided on the front side frame that is a skeletal member, a configuration of the related art in which the bumper beam having a closed cross-sectional structure is adopted, or the like.

Moreover, since the bumper beam 13 is formed in a concave shape opening rearwardly, it is possible to increase the length in the front-rear direction of the bumper beam extension 14 (tube section 41) without changing the distance between the front end edge of the front side frame 11 and the front surface of the bumper beam 13, in comparison with a case of the related art in which the bumper beam having a closed cross-sectional structure is adopted.

Thereby, in addition to suppressing an increase in size, it is possible to increase an impact absorption amount by the bumper beam extension 14 (a deformation amount of the tube section 41), and it is possible to absorb the impact load F further efficiently.

In addition, the bumper beam 13 is formed along the shape of the bumper face 50 and the shape of the gusset 23, and thereby it is possible to improve design flexibility in the external form of the vehicle body 1, the front side frame 11, the lower member 12, or the like.

In addition, the bumper beam 13 is formed in a hat-like cross-sectional shape, and thereby it is possible to produce the bumper beam easily by press working. Specifically, according to the present embodiment, the bumper beam 13 is formed by hot stamping, and thereby it is possible to improve the strength of the bumper beam 13.

Moreover, since the bead 55 is formed in the beam vertical wall 51 of the bumper beam 13, it is possible to improve the rigidity of the bumper beam 13.

By improving the rigidity of the bumper beam 13, it is possible to suppress the local bending in which the connection portion of the bumper beam 13 with the bumper beam extension 14 is the fulcrum. In this case, it is possible to transmit the impact load F efficiently toward the bumper beam extension 14 and the like, and the overall outer portion 13b of the bumper beam 13 can be moved backwardly in association with the compressive deformation of the bumper beam extension 14.

Thereby, it is possible to absorb the impact load F efficiently by the deformation of the bumper beam extension 14, and also to transmit the remaining impact load F efficiently toward the front side frame 11, the lower member 12, and the like.

In addition, since the rear end edge of the beam upper wall 52 of the bumper beam 13 and the rear end edge of the beam lower wall 53 of the bumper beam 13 face the inclined surface 32 of the gusset 23 in the front-rear direction, when the bumper beam 13 fits the gusset 23, the inclined surface 32 is flexurally deformed inwardly in the up-down direction. Namely, since the bumper beam 13 and the gusset 23 can be closely fitted by a spring effect of the inclined surface 32, it is possible to reliably restrict the bending of the bumper beam 13, and also it is possible to reliably transmit the impact load F.

Moreover, since the width L1 in the outer portion of the inclined surface 32 is greater than the width L2 in the inner portion of the inclined surface 32, the above-described spring effect is achieved dominantly in the outer portion of the gusset 23. Thereby, it is possible to absorb the impact load F in the outer portion of the gusset 23 when the bumper beam 13 and the gusset 23 are fitted.

Accordingly, since the impact load F can be absorbed without deforming the bumper beam extension 14, the front side frame 11, the lower member 12, and the like when a relatively small impact load F is input such as at the time of a light collision, it is possible to reduce a repair cost.

In addition, since the distance D between the rear end edge of the bumper beam 13 and the rear end edge of the gusset 23 is substantially the same as the deformation amount along the front-rear direction of the tube section 41, a timing when the fitting of the gusset 23 into the inside of the bumper beam 13 is completed becomes substantially the same as a timing when the compressive deformation of the bumper beam extension 14 (tube section 41) is completed.

Accordingly, since the impact load F can be efficiently absorbed between the bumper beam 13 and the gusset 23, it is possible to suppress the deformation of the front side frame 11 and the lower member 12, and it is possible to reduce a repair cost.

Moreover, since the fit member of the present embodiment is configured as the gusset 23 that bridges the front end portion of the front side frame 11 and the front end portion of the lower member 12, it is possible to suppress an increase of the number of components in comparison with a case in which a fit member of a different body is provided, and also to improve the rigidity of the vehicle body.

In addition, since the work apertures 28 used for spot welding are formed in the portion of the gusset 23 of the present embodiment which is the portion that overlaps in the front-rear direction with the front side frame 11 and in the portion of the gusset 23 which is the portion that overlaps in the front-rear direction with the lower member 12, the attachment between the gusset 23 and the front side frame 11 and the attachment between the gusset 23 and the lower member 12 become easy.

In addition, since the protruding portion 56 formed in the beam flange section 54 of the bumper beam 13 is configured to be capable of being accommodated within the groove portion 33 formed in the gusset flange section 27 of the gusset 23, the bumper beam 13 and the gusset 23 can be further easily and tightly fitted. In addition, the displacement between the bumper beam and the gusset in the vehicle width direction can be suppressed.

In addition, since the gusset installation plate 43 is joined to the gusset vertical wall 24 of the gusset 23 at an outward position in the vehicle width direction relative to the front side frame 11 and is joined to the bent part 19 of the connection member 18 at an inward position in the vehicle width direction relative to the front side frame 11, it is possible to connect the bumper beam extension 14 easily and tightly.

Moreover, since each of the plate upper wall 46 of the bumper beam installation plate 42 and the plate lower wall 47 of the bumper beam installation plate 42 includes the connection step section 48 that protrudes outwardly in the up-down direction, it is possible to connect the bumper beam extension 14 to the bumper beam 13 through this connection step section 48. Thereby, the production efficiency is improved, and mass production is enabled.

In addition, the height along the up-down direction of the bumper beam extension 14 (tube section 41) can be maximally secured within a range of a portion other than the connection step section 48 of the plate upper wall 46 and a portion other than the connection step section 48 of the plate lower wall 47. Thereby, it is possible to secure the cross-sectional area of the bumper beam extension 14 (tube section 41) and to absorb the impact load F effectively.

While preferred embodiments of the invention have been described and illustrated above, it should be understood that these are exemplary examples of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, the above embodiment is described using a configuration in which the vehicle body frame structure of the present invention is applied to the front portion structure 2 so as to absorb the impact load F at the time of a front collision; however, the configuration is not limited thereto. The vehicle body frame structure of the present invention may be applied to a rear portion structure of the vehicle body so as to absorb an impact load at the time of a rear collision.

In addition, each of the bumper beam 13 and the gusset 23 is formed in a hat-like cross-sectional shape; however, the configuration is not limited thereto. A configuration may be used in which the bumper beam 13 is formed in a concave shape, the gusset 23 is formed in a protrusion, and the bumper beam 13 and the gusset 23 are configured to be capable of fitting to each other.

In addition, the above embodiment is described using a configuration in which the fit member of the present invention is configured as the gusset 23; however, a fit member of another body different from the gusset may be provided.

Moreover, the above embodiment is described using a configuration in which the bead 55 is formed over the whole in the vehicle width direction of the bumper beam 13. However, the configuration is not limited thereto. Only part of the bumper beam 13, for example, only the outer portion 13b of the bumper beam 13 may be formed. In addition, a plurality of beads 55 may be formed to be arranged in the up-down direction.

In addition, the above embodiment is described using a configuration in which one protruding portion 56 of the beam flange section 54 and one groove portion 33 of the gusset flange section 27 are formed. However, the configuration is not limited thereto. A plurality of protruding portions 56 and a plurality of groove portions 33 may be formed.

Further, the components of the embodiment described above can be replaced with well-known components without departing from the scope of the present invention.

DESCRIPTION OF THE REFERENCE SYMBOLS

2: FRONT PORTION STRUCTURE (VEHICLE BODY FRAME STRUCTURE)
11: FRONT SIDE FRAME (SIDE FRAME)
12: LOWER MEMBER (SUBFRAME)
13: BUMPER BEAM
14: BUMPER BEAM EXTENSION (IMPACT ABSORPTION MEMBER)
17: FRONT BULKHEAD (BULKHEAD)
18: CONNECTION MEMBER
23: GUSSET (FIT MEMBER)
24: GUSSET VERTICAL WALL (FIT MEMBER VERTICAL WALL)
25: GUSSET UPPER WALL (FIT MEMBER UPPER WALL)
26: GUSSET LOWER WALL (FIT MEMBER LOWER WALL)
27: GUSSET FLANGE SECTION (FIT MEMBER FLANGE SECTION)
28: WORK APERTURE
32: INCLINED SURFACE
33: GROOVE PORTION
42: BUMPER BEAM INSTALLATION PLATE
46: PLATE UPPER WALL

47: PLATE LOWER WALL
48: CONNECTION STEP SECTION
50: BUMPER FACE
51: BEAM VERTICAL WALL
52: BEAM UPPER WALL
53: BEAM LOWER WALL
54: BEAM FLANGE SECTION
55: BEAD
56: PROTRUDING PORTION

The invention claimed is:

1. A vehicle body frame structure, comprising:
a pair of side frames that extend along a vehicle body front-rear direction on both sides in a vehicle width direction;
a subframe that extends along the vehicle body front-rear direction on the outside in the vehicle width direction of the side frame;
a bumper beam provided on the outside in the vehicle body front-rear direction of the side frame and extending along the vehicle width direction;
an impact absorption member provided between the side frame and the bumper beam; and
a fit member that connects an outer end portion in the vehicle body front-rear direction of the side frame and an outer end portion in the vehicle body front-rear direction of the subframe and that is formed in a protrusion protruding outwardly in the vehicle body front-rear direction, wherein
the bumper beam is configured to extend more outwardly in the vehicle width direction than the side frame, to have a concave shape opening inwardly in the vehicle body front-rear direction, and to be capable of fitting the fit member.

2. The vehicle body frame structure according to claim 1, further comprising:
a bumper face that covers the bumper beam from the outside in the vehicle body front-rear direction, wherein
a beam vertical wall of the bumper beam is formed along an inner surface of the bumper face, and an inner edge in the vehicle body front-rear direction of a beam upper wall of the bumper beam and an inner edge in the vehicle body front-rear direction of a beam lower wall of the bumper beam are formed along an outer surface of the fit member.

3. The vehicle body frame structure according to claim 1, wherein the bumper beam is formed in a hat-like cross-sectional shape.

4. The vehicle body frame structure according to claim 1, wherein the bumper beam is formed by hot stamping.

5. The vehicle body frame structure according to claim 1, wherein a bead that extends along the vehicle width direction is formed in the beam vertical wall of the bumper beam.

6. The vehicle body frame structure according to claim 1, wherein
the fit member is formed in a hat-like cross-sectional shape opening inwardly in the vehicle body front-rear direction;
each of a boundary portion of a fit member upper wall of the fit member with a fit member flange section and a boundary portion of a fit member lower wall of the fit member with a fit member flange section is formed as an inclined surface that inclines outwardly in a vehicle body up-down direction toward the inside in the vehicle body front-rear direction; and
an inner edge in the vehicle body front-rear direction of a beam upper wall of the bumper beam and an inner edge in the vehicle body front-rear direction of a beam lower wall of the bumper beam face the inclined surfaces in the vehicle body front-rear direction.

7. The vehicle body frame structure according to claim 6, wherein an outer portion of the inclined surface positioned outwardly in the vehicle width direction is wider along the vehicle body front-rear direction than an inner portion of the inclined surface positioned inwardly in the vehicle width direction.

8. The vehicle body frame structure according to claim 1, wherein
the impact absorption member is configured to be capable of being deformed compressively in the vehicle body front-rear direction, and
a deformation amount along the vehicle body front-rear direction of the impact absorption member is substantially the same as a distance along the vehicle body front-rear direction between an inner end portion in the vehicle body front-rear direction of the bumper beam and an inner end portion in the vehicle body front-rear direction of the fit member.

9. The vehicle body frame structure according to claim 1, wherein the fit member is configured as a gusset that connects an outer end portion in the vehicle body front-rear direction of the side frame and an outer end portion in the vehicle body front-rear direction of the subframe.

10. The vehicle body frame structure according to claim 1, wherein a work aperture used for spot welding between the fit member and the side frame is formed in a portion of a fit member vertical wall of the fit member which is the portion that overlaps in the vehicle body front-rear direction with the side frame, and a work aperture used for spot welding between the fit member and the subframe is formed in a portion of a fit member vertical wall of the fit member which is the portion that overlaps in the vehicle body front-rear direction with the subframe.

11. The vehicle body frame structure according to claim 1, wherein
the bumper beam is formed in a hat-like cross-sectional shape;
a protruding portion that protrudes inwardly in the vehicle body front-rear direction is formed in a beam flange section of the bumper beam; and
a groove portion that accommodates the protruding portion is formed in a portion of the fit member which is the portion that overlaps in the vehicle body front-rear direction with the protruding portion.

12. The vehicle body frame structure according to claim 1, wherein
an inner end portion in the vehicle body front-rear direction of the impact absorption member is joined to the fit member at an outward position in the vehicle width direction relative to the side frame, and
an inner end portion in the vehicle body front-rear direction of the impact absorption member is joined to a connection member that connects a bulkhead and the side frame at an inward position in the vehicle width direction relative to the side frame.

13. The vehicle body frame structure according to claim 1, wherein
the bumper beam is formed in a hat-like cross-sectional shape;
the impact absorption member comprises a bumper beam installation plate having a U shape in cross-sectional view and provided along an inner surface of the bumper beam; and
both end portions in the vehicle width direction of a plate upper wall of the bumper beam installation plate is provided with a connection step section that protrudes outwardly in a vehicle body up-down direction from the plate upper wall, and both end portions in the vehicle width direction of a plate lower wall of the bumper beam installation plate is provided with a connection step section that protrudes outwardly in the vehicle body up-down direction from the plate lower wall.

* * * * *